Feb. 26, 1957 W. JORDAN 2,782,549
FISH LURE
Filed July 16, 1953
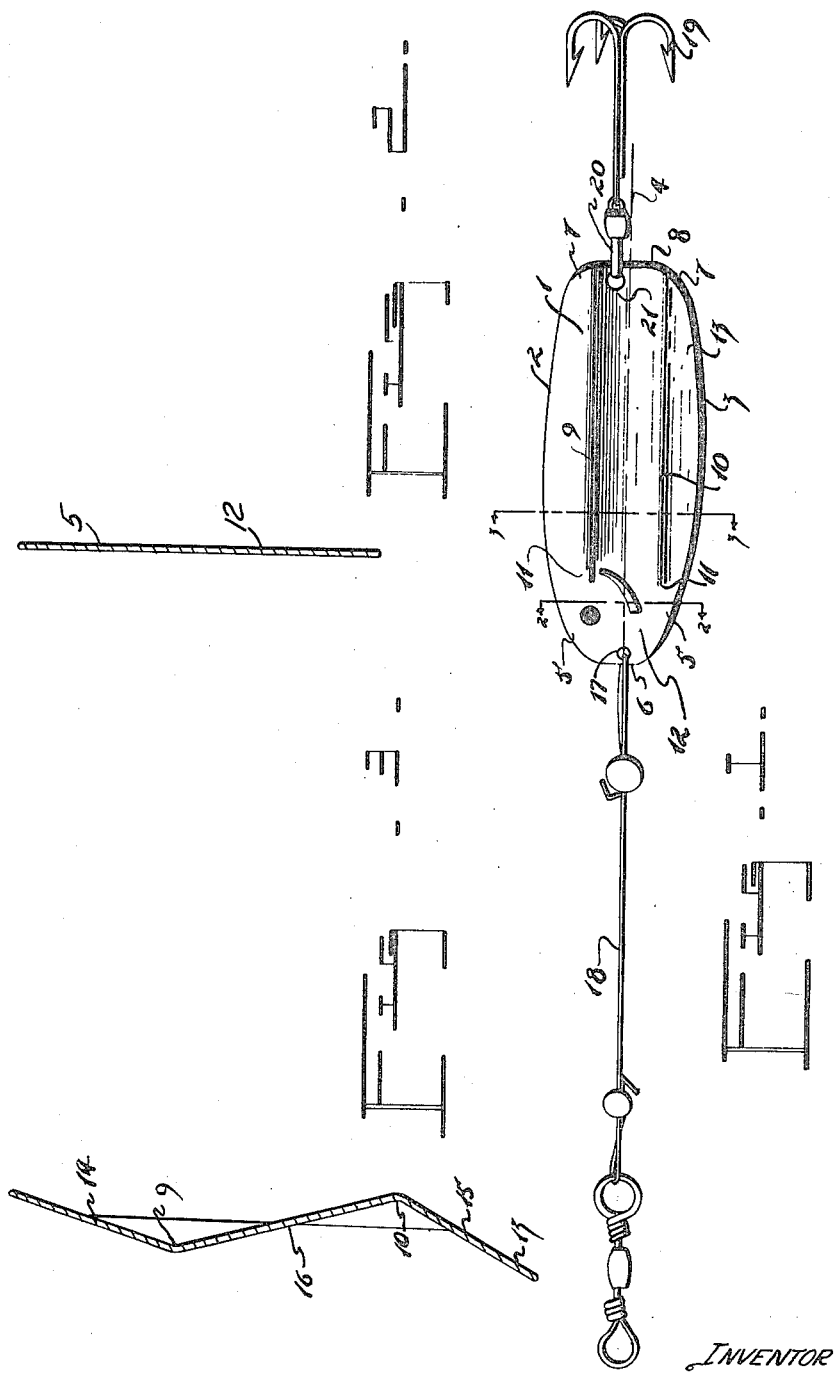
INVENTOR
WALTER JORDAN
BY
ATTORNEYS

United States Patent Office 2,782,549
Patented Feb. 26, 1957

2,782,549

FISH LURE

Walter Jordan, Edmonton, Alberta, Canada

Application July 16, 1953, Serial No. 368,251

1 Claim. (Cl. 43—42.51)

My invention relates to new and useful improvements in fish lures, the principal object of my invention being to provide a lure which is relatively simple structurally, yet which has an improved action, both when being cast and when being trolled.

Another object of my invention is to provide a device of the character herewithin described which is adapted to either undulate from side to side or to spin, as desired.

A further object of my invention is to provide a device of the character herewithin described which is readily adapted for manufacture in varying colours and the like, and which, furthermore, is extremely simple to manufacture.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of my device.

Figure 2 is a section substantially along the lines 2—2 of Figure 1.

Figure 3 is a section substantially along the lines 3—3 of Figure 1.

The majority of plate type lures used in fishing are either classified as spinners or wigglers, and it has long been felt that a lure which could do either as desired would be an improvement.

The lure hereinafter to be described satisfies these requirements, as it can be used either as a spinner or as a wriggler.

Proceeding now to describe my invention in detail, it will be seen upon reference to the accompanying drawings that it consists of a lure body formed from a substantially rectangular plate 1 having a relatively thin cross-section and having curved upper and lower edges 2 and 3 respectively substantially symmetrical around the common longitudinal axis 4.

Said upper and lower edges 2 and 3 curve gradually as at 5 into the relatively short vertical front edge 6, whereas the rear end of the upper and lower edges terminate more sharply as at 7 with the vertical rear edge 8, which is considerably longer than the front edge 6.

The plate 1 is double angulated or formed with bends in opposite directions to provide upper and lower portions 14 and 15, respectively, the lines 9 and 10 of the bends being parallel to the longitudinal axis 4, these upper and lower portions extending along approximately four-fifths of the length of the plate and terminating adjacent the points indicated by the reference character 11, so that the forward portion 12 of the lure is completely planar, as clearly illustrated in Figure 2, whereas the rear portion 13 is angulated as shown in Figure 3.

These angulations or bends thus form substantially equal upper and lower portions 14 and 15 separated by a centre portion 16, all of the portions lying in different planes in angular relationship one with the other, as clearly shown in Figure 3.

An aperture 17 is formed substantially upon the longitudinal axis and in the front portion 12 by which the lure may be attached to a leader 18 of conventional design.

A hook element 19 of conventional design is swingably attached by means of link 20 to the rear end of the lure adjacent the rear edge 8 thereof and it will be noted that the element is secured via an aperture 21 which is situated above the longitudinal axis 4, thus giving a slightly unbalanced state to the lure which, in combination with the planar front portion 12 thereof and the angulated portion 13 thereof, causes the lure to have a wiggling action under certain conditions.

In operation, the aforementioned combination of the off-centred hook element and the planar and angulated portions of the lure, cause the lure to undulate from side to side when moved relatively slow through the water with frequent pauses. However, when pulled through the water with a continuous motion and relatively fast, the angulated portion overcomes the unbalanced tendencies and permits the lure to spin, thus giving a totally different action thereto, the latter action representing a fish moving at speed, whereas the intermittent undulating action caused by the unbalance and the like, represents a wounded fish.

Since various modifications can be made in my invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

What I claim as my invention is:

A fish lure comprising a relatively thin plate having, when viewed in side elevation, oppositely curved upper and lower edges, a vertical rear edge and a vertical front edge, said upper and lower edges curving into said front and rear edges, said rear edge being longer than said front edge, and a hook element secured adjacent said rear edge, said hook being pivotally secured adjacent said rear edge at a point removed from the longitudinal centre line of said plate, said plate having bends in opposite directions to provide upper and lower portions, the lines of said bends being parallel to the longitudinal axis, along the major part of the length thereof so that when viewed in cross-section, said plate includes upper and lower portions in spaced relationship, separated by a centre portion, said portions lying in different planes in angular relationship one with the other.

References Cited in the file of this patent

UNITED STATES PATENTS

| | | |
|---|---|---|
| D. 153,676 | Gardemeyer | May 10, 1949 |
| 962,319 | Crosby | June 21, 1910 |
| 1,738,617 | Scharrer | Dec. 10, 1929 |
| 1,902,560 | Kilpatrick | Mar. 21, 1933 |
| 1,903,558 | Taylor | Apr. 11, 1933 |
| 2,608,788 | Niemi | Sept. 2, 1952 |
| 2,667,007 | Heron | Jan. 26, 1954 |